US006780340B2

(12) United States Patent
Conta

(10) Patent No.: US 6,780,340 B2
(45) Date of Patent: Aug. 24, 2004

(54) EJECTION HEAD FOR AGGRESSIVE LIQUIDS MANUFACTURED BY ANODIC BONDING

(75) Inventor: Renato Conta, Ivrea (IT)

(73) Assignee: Olivetti Tecnost S.p.A., Ivrea (IT)

( * ) Notice: Subject to any disclaimer, the term of this patent is extended or adjusted under 35 U.S.C. 154(b) by 4 days.

(21) Appl. No.: 10/296,629

(22) PCT Filed: May 25, 2001

(86) PCT No.: PCT/IT01/00266

§ 371 (c)(1),
(2), (4) Date: Nov. 26, 2002

(87) PCT Pub. No.: WO01/92715

PCT Pub. Date: Dec. 6, 2001

(65) Prior Publication Data

US 2003/0131475 A1 Jul. 17, 2003

(30) Foreign Application Priority Data

May 29, 2000 (IT) .................................... TO2000A0494

(51) Int. Cl.[7] ........................ G01D 15/00; G11B 5/127; B21D 53/76; B23P 17/00

(52) U.S. Cl. ......................................... 216/27; 29/890.1

(58) Field of Search .......................... 216/27; 29/890.1; 438/21; 347/20, 22, 29, 44, 47, 54, 55, 56, 63, 64, 65, 67, 68, 71, 74, 75

(56) References Cited

U.S. PATENT DOCUMENTS

| | | | |
|---|---|---|---|
| 3,397,278 | A | 8/1968 | Pomerantz |
| 5,437,255 | A | 8/1995 | Sadley et al. |
| 5,842,258 | A | 12/1998 | Harvey et al. |

FOREIGN PATENT DOCUMENTS

| | | | |
|---|---|---|---|
| DE | 41 33 897 | A1 | 4/1993 |
| DE | 42 19 132 | A1 | 12/1993 |
| DE | 198 31 335 | A1 | 2/2000 |
| EP | 0 970 812 | A1 | 1/2000 |
| EP | 0 999 055 | A2 | 5/2000 |
| FR | 2 742 811 | A | 6/1997 |
| WO | WO 97/01085 | | 1/1997 |

OTHER PUBLICATIONS

Patent Abstracts of Japan, vol. 1997. No. 2, Feb. 28, 1997, JP 08 252465 A (Hitachi Koki Co Ltd.), Oct. 1, 1996 Abstract.

Patent Abstracts of Japan, vol. 14, No. 382, Aug. 17, 1990, JP 02 141442 A (Mitsubishi Electric Corp.), May 30, 1990 Abstract.

*Primary Examiner*—P. Hassanzadeh
*Assistant Examiner*—Roberts Culbert
(74) *Attorney, Agent, or Firm*—Banner & Witcoff, Ltd.

(57) ABSTRACT

A method for manufacturing an ejection head (10) or ejector suitable for ejecting in the form of droplets (16) a liquid (14) conveyed inside the ejection head (10), comprising a step of producing, from a silicon wafer, a nozzle plate (12) having at least one ejection nozzle (13); a step of producing, from another silicon wafer, a substrate (11) having at least one actuator (15) for activating the ejection of the droplets of liquid through the nozzle (13); and a step of joining the nozzle plate (12) and the substrate (11) together to form the ejection head, wherein this joining step comprises the production of a junction (25), made by means of the anodic bonding technology, between the substrate (11) and the nozzle plate (12), in such a way that, in the area of this junction (25), the ejection head (10) does not present structural discontinuities, and also possesses a resistance to chemical corrosion by the liquid (14) contained in the ejection head (10) at least equal to that of the silicon constituting both the substrate (11) and the nozzle plate (12). The method of the invention may be applied for manufacturing an ink jet printhead (110), having one or more nozzles (113*a*, 113*b*, etc.), which has the advantage, with respect to the known printheads, of also being suitable for working with special inks characterized by high level chemical aggressiveness. In general, the ejection head of the invention, thanks to its structure which is globally highly robust and also chemically inert in the area of the junction (25), can be used advantageously with various types of liquids, even with marked chemical aggressiveness, in different sectors of the art, for example for ejecting paints on various types of media, generally not paper, in the industrial marking sector; or for ejecting in a controlled way droplets of fuel, such as petrol, in an internal combustion engine.

11 Claims, 6 Drawing Sheets

EJECTION HEAD FOR AGGRESSIVE LIQUIDS MANUFACTURED BY ANODIC BONDING

This is a U.S. National phase Application Under 35 USC 371 and applicant herewith claims the benefit of priority of PCT/IT01/00266 filed May 25, 2001, which was published Under PCT Article 21(2) in English and Application No. TO2000A000494 filed in Italy on May 29, 2000.

TECHNICAL FIELD

This invention relates in general to the sector of ejection heads for ejecting liquids in the form of droplets, and in particular to an ejection head provided with a structure that makes this ejection head highly suited to working with liquids having a high level of chemical aggressiveness.

The invention also relates to a method for manufacturing an ejection head provided with a special resistance to chemically highly aggressive liquids, so as to be able to be employed advantageously in combination with this category of liquids.

BACKGROUND ART

The ejection head, also called simply ejector or injector in the following, according to the invention has characteristics that render it advantageous for use in numerous industrial sectors, even with specifics, characteristics and problems differing completely from one sector to the next.

In particular, among the possible sectors of application are, purely by way of example, that of ink jet printing, or that of fuel injection in an internal combustion engine.

As will be clear in the remainder of the description, the ejection head of the invention presents significant similarities, both structural and operational, with a thermal ink jet printhead, of the type working on the basis of the so-called bubble ink jet printing technology. Printheads of this type are widely known in the sector of ink jet printing technologies, where they are applied in a variety of solutions, and are still undergoing significant developments.

Therefore, for the sake of completeness and in order to facilitate the understanding of this description, and also in consideration of the fact that the ink jet printing sector constitutes, as already said, one of the possible and main fields of application of this invention, the general characteristics of these bubble type thermal ink jet printheads and some of their most recent developments will be set down in short below. As is known, in the printheads working with the bubble type ink jet technology, the ink contained in the printhead is brought to boiling point by thermal actuators consisting of electrical resistances which are powered with opportune current pulses in order to activate, inside the ink, the appearance of a bubble of vapour which, by expanding, causes ejection of the droplets through a plurality of nozzles in the printhead.

The printheads operating with the bubble technology may be divided into two main categories, depending on their structure, called respectively "top shooter" and "edge shooter". In the first type, the nozzle consists of an aperture arranged immediately above the thermal actuator and separated from the latter by a small chamber filled with ink, so that the expansion of the bubble of vapour is used in a direction perpendicular to the thermal actuator so as to eject the droplet through the aperture. In the second type, the thermal actuator is disposed along the wall of a duct a short way from the duct's outlet section to the outside, so that the expansion of the bubble of steam is used in a direction transversal to the actuator to eject the drop laterally through the outlet section of the duct.

This bubble technology has been a standard in the printing sector for many years now, and is applied with success on numerous models of ink jet printheads, both for black and white printing and for colour printing. In particular, the ink jet printheads that work according to this technology are moving towards ever greater levels of integration and complexity, the objective being to comprise a greater number of circuits, nozzles and functions, and therefore attain ever greater printing speeds and definitions. One of the most recent examples of this technical development is represented by what are known as the monolithic printheads, i.e. by thermal ink jet heads in which the nozzle plate is made, not as a separate part, but together with the other parts of the printhead, particularly with those parts that constitute the driver circuits of the actuators and the hydraulic network for conveying the ink inside the printhead.

Therefore in these monolithic heads, the nozzle plate does not constitute a piece which is made separately and mounted at the end of the process of manufacturing the printheads, but rather a part which is formed progressively in the manufacturing process, so that each printhead acquires a typically monolithical structure integrating the various parts.

Hand in hand with the constant evolution of the bubble ink jet thermal printheads, the inks that can be used on these heads have also evolved considerably, which has led to a continuous improvement in their quality and reliability.

Generally speaking, evolution of the printheads has been accompanied by a corresponding evolution of the inks, the objective being to research ever better combinations between the printing media intended for receiving the droplets of ink, the structural characteristics of the head, and the chemical characteristics of the inks.

Typically this research into inks has been conducted with the objective of formulating inks capable both of improving the print quality on an ever broader range of print media, and of mating optimally with the new structures of printheads brought out with time.

In this way, both black and coloured inks have been formulated capable of minimizing the problem of clogging of the nozzles, cause by sedimentation of the pigments contained in the inks, despite the ever more intense miniaturization of the printheads and the reduction of the diameter of the nozzles in order to obtain ever smaller droplets.

Additionally, the research has permitted to define optimal combinations between inks and materials used in manufacturing the heads, with inks and materials compatible with one another, i.e. capable of not triggering off undesired reactions, and of maintaining their nominal characteristics in time, so as not to have negative effects on the operation and reliability of the printheads. In particular, this research into, as stated, constantly improving the combination between inks, print media, and printheads, has obviously addressed the formulation of inks having a low or practically null degree of chemical aggressiveness, namely inks free of substances capable of aggressing, corroding and reacting with, even only minimally, the various materials employed in manufacturing the heads and wetted by the inks.

For instance, it was attempted to avoid those inks containing substances that could interact with the organic compounds usually employed in making the junctions between the parts of the head. However, in this way, recent research in inks has in fact resulted in a certain consolidation, regarding their use on printheads, of inks with a null or practically null level of chemical aggressiveness.

At the same time, the possibility was ignored of employing these printheads in combination with particular types of ink and/or in general liquids which, though widely applied and capable of giving optimal results in certain fields, including different from printing true and proper, possessed however characteristics of chemical aggressiveness incompatible with the structure of the printheads that were being developed, and in particular contained aggressive substances certainly capable of corroding them and compromising their operation in time.

Besides, as is easy to imagine, it could be very useful and advantageous to be able to dispose of a new ink jet printhead, of the type based on the bubble technology or also on other technologies, having the ability to work with inks, perhaps already employed with success in various applications, including different from printing on paper, but unfortunately containing corrosive and/or aggressive substances likely to damage in time the structure and the materials of the currently known bubble type thermal ink jet heads. In fact, in this way the application possibilities for these printheads could be considerably extended, considering the new properties, essential characteristics and performance advantages that these corrosive substances could confer on the inks employed with them. Unfortunately however, as said, in reality the known ink jet printheads do not have a structure capable of resisting corrosive agents that may possibly be present in the inks employed with the printheads, so that in this hypothetical case they would rapidly enter decay.

For example, as is known, inks known to be typically aggressive, containing for instance urea, and/or having a determined acidic PH, can certainly not be used on the current thermal heads, because they would surely damage the junctions and the gluing zones between the different layers comprising the structure of the head.

There are also sectors in the art, again completely different from that of ink jet printing and the relative printheads, in which it is necessary to eject liquids in the form of droplets, preferably also very small, and in which these liquids to be ejected are particularly aggressive from the chemical viewpoint, and at any rate have a composition incompatible with the structure of the currently known printheads An important one of these sectors, briefly hinted at above, is that of the injection of a fuel, such as diesel or petrol, in the combustion chamber of an internal combustion engine. In this sector, the solutions normally adopted for fuel injection are based on mechanical type injectors, which however have the disadvantage of not reaching a sufficient degree of miniaturization of the droplets, or to put it better, that degree of miniaturization which would allow a better and more precise dosage of the fuel, and accordingly to attain better performance of the engine, such as for instance a higher thermal efficiency.

Therefore, potentially at least, this sector could avail of the ink jet technology which, in comparison with the traditional fuel ejectors, has been shown capable of obtaining droplets of liquid much smaller in volume, as also of obtaining in general a better and more efficient control of the quantity of liquid ejected in droplet form.

Yet another sector where there may be the need to dose in a precise and controlled way particularly aggressive liquids from the chemical viewpoint is the biomedical sector.

DISCLOSURE OF THE INVENTION

The general object, therefore, of this invention is to produce a new ejection head which, though bearing some similarities to the known ink jet printheads, substantially innovates with respect to the latter, and in particular possesses characteristics likely to make its use possible and advantageous in combination with particularly aggressive liquids from a chemical viewpoint, including in industrial sectors highly different from ink jet printing, and for example in the sector of injection of fuel in an internal combustion engine.

This object is achieved by the ejection head and corresponding manufacturing method having the characteristics defined in the main independent claims.

A more specific object of this invention is to produce an ink jet printhead, of the type operating with the bubble technology or other technologies, that can be used without drawbacks with aggressive inks notoriously capable of chemically reacting with and/or corroding the materials, typically organically based ones, currently used in the manufacture of printheads, so as to allow, at least potentially, an extension of the possibilities of industrial application of the technologies and concepts developed in connection with the known printheads to sectors up till now excluded from these technologies and concepts.

These and other objects, characteristics and advantages of the invention will be apparent from the description that follows of a preferred embodiment, provided purely by way of an illustrative, non-restrictive example, with reference to the accompanying drawings.

BEST MODE OF CARRYING OUT THE INVENTION

Figure 1:
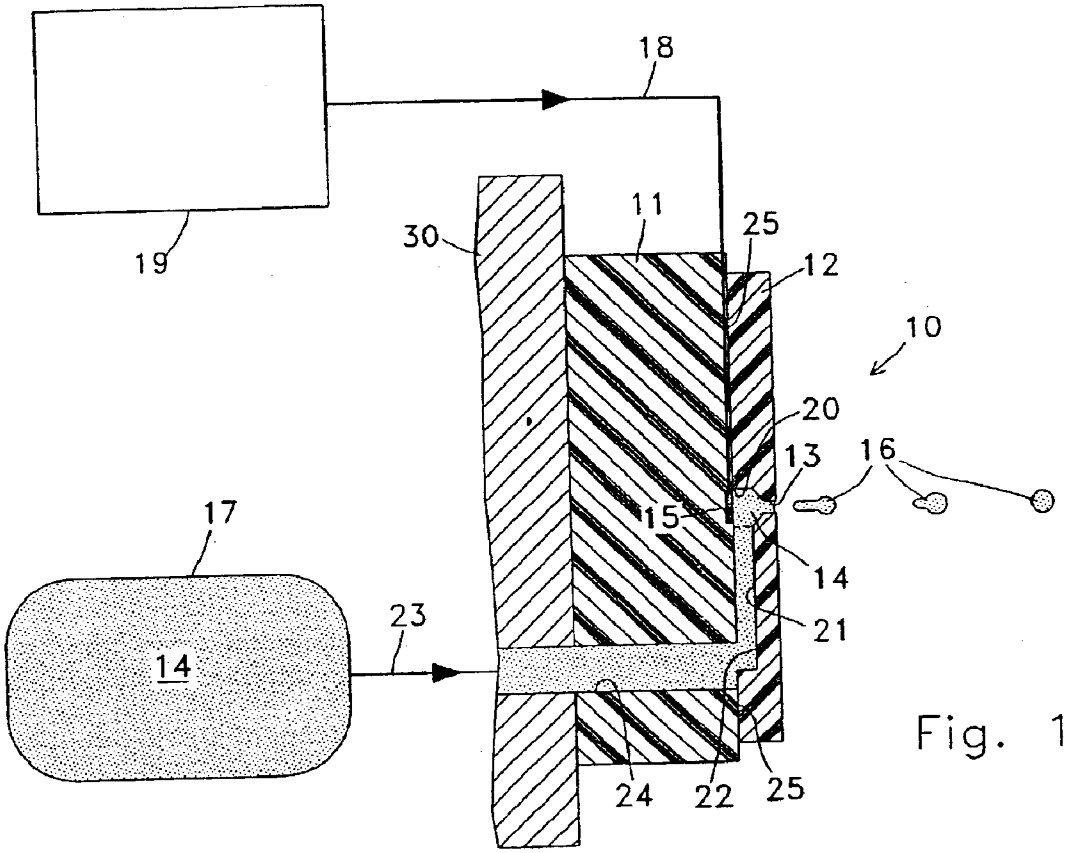
FIG. 1—is a schematic, sectional view of a head for the ejection of droplets of liquid according to this invention.
Figure 2:
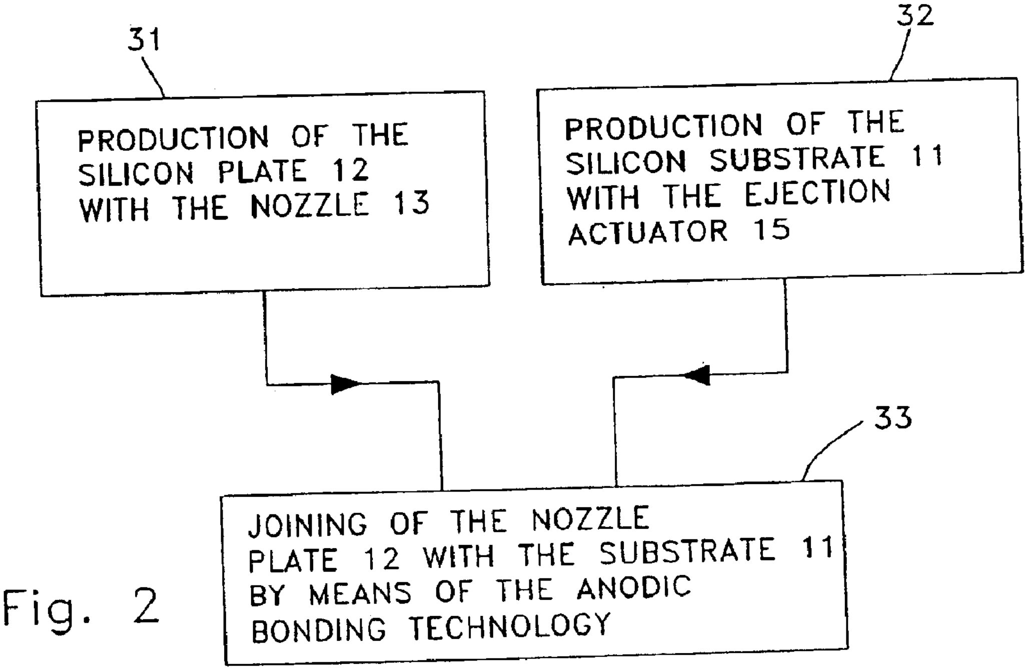
FIG. 2—is a synthetic flow diagram of a method according to this invention for manufacturing the ejection head of FIG. 1.

With reference to FIGS. 1 and 2, a head for the ejection of droplets of liquid, also called ejection head in the following, or ejection device, or more simply ejector, made according to the method of this invention, is generically depicted with the numeral 10, and comprises a substrate 11, also called actuation support, which bears at least one actuator 15, also called in the following ejection actuator; a nozzle plate 12, also called orifice plate, which is provided with at least one nozzle 13 and is permanently connected to the substrate 11 along a junction zone 25; and a hydraulic circuit 21, arranged inside the head 10, the function of which is to contain and convey a liquid 14 in the zone 10 between the actuator 15 and the nozzle 13, in such a way that they are both wetted by the liquid 14.

The ejection head 10 is permanently attached along the substrate 11 on a carrier 30. The actuator 15 is positioned, along the substrate 11, in a zone adjacent to the nozzle 13, and is suitable for periodically activating, in the volume of liquid 14 that separates it from the nozzle 13, a wave of pressure, or in general a pumping effect, such as to cause the emission of a plurality of droplets 16 formed by the liquid 14, through the nozzle 13.

To this end, the actuator 15 is arranged for being driven directly by means of suitable electric signals or pulses, each corresponding to an ejected drop, which are controlled by an electronic control unit 19 of the ejection head 10.

The actuator 15 may also be associated with actuation circuits, arranged between the actuator and the control unit 19, which, under the control of the control unit 19, have the specific function of generating the pulses which directly control the actuator 15 for generating the droplets 16.

In FIG. 1, the line 18 schematically represents the electrical connection, between the control unit 19 and the actuator 15, the function of which is that of transmitting the signals intended for commanding the actuator 15 to cause ejection of the droplets 16.

In particular, the hydraulic circuit 21 comprises a first inlet duct 24, for conveying the liquid 14, which extends through the substrate 11; a second inlet duct 22 which is formed in the nozzle plate 12 and which is in communication with one end of the first duct 24; and at least one chamber 20, also formed in the nozzle plate 12, which is adjacent to both the actuator 15 and the nozzle 13.

The chamber 20 is suitable for being fed with the liquid 14 through the inlet duct 22, and defines an internal space in which the liquid 14 is subjected to the wave of pressure generated by the actuator 15 for being ejected through the nozzle 13.

In addition, the ejection head 10 is associated with a tank 17, containing a certain quantity of liquid 14, which constitutes a reserve for the liquid 14 to be fed to the chamber 20 of the ejection head 10, and which for this purpose is in communication with the hydraulic circuit 21, through a feeding duct 23.

In this way, the ejection head 10 can receive the liquid 14 continuously from the tank 17, so that it is ejected in the form of droplets 16 towards the outside of the ejection head 10 through the nozzle 13.

The technologies used for generating in the liquid 14 the above-mentioned pumping effect which results in ejection of the droplets 16 of liquid may be of various types and be based on different principles. For simplicity's sake, in this description, reference will preferably be made to the bubble type ejection technology, widely known and used in the sector of printers, which is based on the generation by the actuator 15, in the zone of the nozzle 13, of a micro bubble of liquid vapour which, on expanding, causes the ejection of a droplet of liquid through the nozzle 13. Clearly, however, the description that will be given must not be seen as tending to limit the scope of this invention to this particular liquid droplet ejection technology.

For instance, by way of alternative to the bubble technology, the pumping effect for ejection of the droplets could be obtained from the deformation of a piezoelectric type actuator.

This much said, in the bubble technology mentioned, the actuator 15 consists of a resistor which, in practice, is driven by the control unit 19 with a brief current pulse sufficient to determine, by the joule effect, a rapid heating of the same resistor 15.

Accordingly the liquid 14 arranged in the immediate vicinity of the resistor 15 is brought to evaporation, and therefore causes the appearance of a vapour bubble, derived from the liquid 14, which by expanding exerts a pumping effect in the direction of the nozzle 13 to determine, through the latter, the ejection of a droplet 16

Then, at the end of the pulse, on account of the simultaneous cooling of the resistor 15, the vapour bubble collapses, so that the liquid 14 adjacent to the resistor 15 returns to its starting conditions, and the resistor 15 can once again be activated with a new pulse to cause the ejection of a new droplet 16. In short, this cycle is repeated periodically, driving the resistor 15 with a predetermined succession of pulses which result in the generation of a like number of vapour bubbles adjacently to the resistor 15, and the ejection of corresponding droplets 16 through the nozzle 13.

As illustrated in FIG. 1, the nozzle 13 is arranged to the front with respect to the resistor 15, so that the expansion of the vapour bubble is used in the normal direction to the resistor 15 to eject the droplet 16. This disposition, as already said, is often called "top shooter" type, and is typical of an important category of ejection heads which are based on the bubble technology. However the relative disposition between the ejection actuator and the nozzle may also be different from that shown in FIG. 1, without departing from the scope of this invention.

As described in detail later, the liquid 14 used on the ejection head 10 for being ejected in the droplet form may also be of different types, and have completely different compositions from one type of liquid to the next, depending on the specific sector in which the ejection head 10 is applied, and therefore of the specific characteristics that the liquid must possess in relation to that given sector. The nozzle plate 12 and the substrate 11 constitute the essential parts of this ejection head 11, and are produced in two distinct processes, indicated in FIG. 2 with the numerals 31 and 32 respectively, before subsequently being assembled and connected permanently together, during a step 33, in order to form the ejection head 10.

For clarity's sake, the two manufacturing processes 31 and 32, respectively of the nozzle plate 12 and of the substrate 11, will be described separately, starting with that of the nozzle plate 12.

Figure 3:
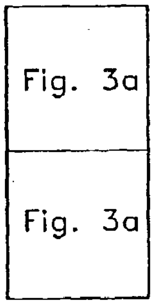
FIG. 3—(section a–g), comprising
Figure 3A:
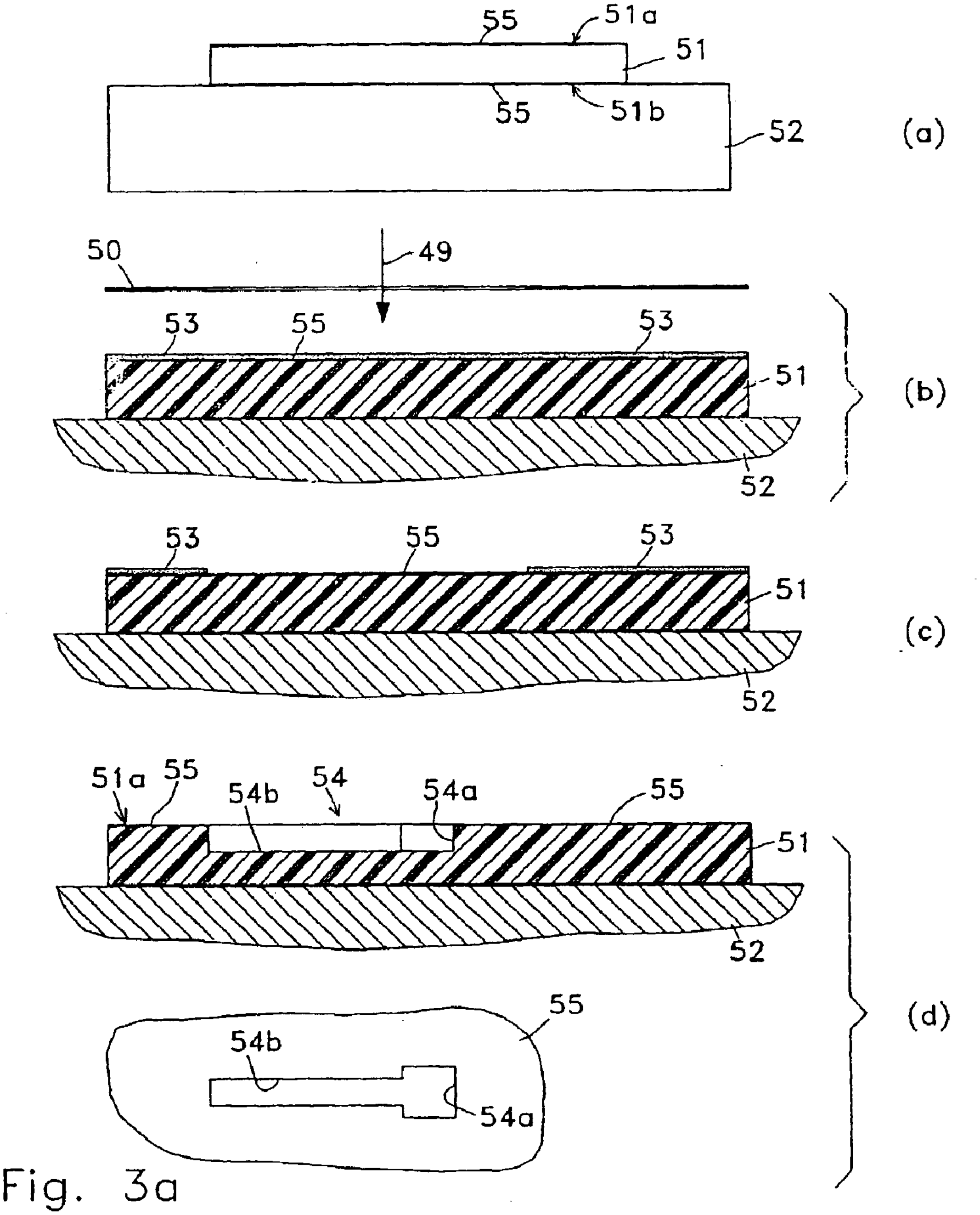
FIG. 3*a* and FIG. 3*b*, is a sectional view illustrating in sequence the various steps for manufacturing a plate with nozzle of the ejection head of FIG. 1.

With reference to FIG. 3, this process comprises an initial step, represented in section (a) of FIG. 3*a*, wherein a wafer of silicon 51, having two opposite faces indicated respectively 51*a* and 51*b*, is stuck using an adhesive substance on a carrier 52, for example on the side 51*b*.

The wafer 51 may readily be found in commerce and has a standard shape, for example round shape having diameter 3" and approximate thickness 75 $\mu$m.

The carrier 52 too may consist of a known type wafer, even if considerably thicker than the wafer 51 used to make the nozzle plate 12.

For example the carrier 52 may be made of a round wafer of diameter 4", thickness 0.5 mm, either of standard silicon type, or of glass or ceramic.

The wafer 51 is oxidised on the outside, so as to present on its two opposite faces, 51*a* and 51*b*, a thin layer 55 silicon dioxide $SiO_2$, of thickness 0.3÷0.4 μm for example.

After being mounted on the carrier 52, the wafer 51 is covered in a known way, on its free face 51*a* opposite that 51*b* stuck on the carrier 52, with a thin layer 53 of a light-sensitive substance, called "photoresist", 1–3 μm thick.

In particular the photoresist constituting the layer 53 is positive type, i.e. it is such as to be, under normal conditions, resistant and not subject to attack from certain substances, and as to become, on the other hand, easy to dissolve and remove by these substances, if exposed to light radiation.

According to known techniques and as illustrated in FIG. 3*a*—section (b), after application on the wafer 51 this layer 53 of positive photoresist is subsequently illuminated with light 49 coming through a suitable mask 50 having a given configuration which corresponds to the positive image of those parts of the hydraulic circuit 21, namely the inlet duct 22 and the chamber 20, that will be formed in the nozzle plate 12.

In this way, the layer 53 is impressioned in such a way as to become removable in the subsequent operation only in the areas illuminated by the light 49.

Conveniently, for the purpose of reaching economies of scale and improving the efficiency of the production process, the wafer 51 can be used for manufacturing a plurality of nozzle plates 12, each corresponding to an elementary area of the wafer 51.

To this end, the mask 50 is arranged with a configuration which is made up of a plurality of equal profiles, each reproducing a hydraulic circuit 21 to be made on a corresponding elementary area of the wafer 51. Accordingly the positive photoresist 53 is illuminated through the mask 50, and therefore becomes removable, along a plurality of equal zones, one for each elementary area of wafer 51, which correspond to the profiles of the mask 50.

For simplicity's sake, FIG. 3*a*—section (b), as also the following ones, refer to and represent the structural changes which occur only in one elementary area of the wafer 51, though it will be clear that what is depicted in each of these figures is to be considered as repeated exactly in each of the other elementary areas of the wafer 51.

Therefore, using known techniques, the layer 53 of photoresist is developed, removing therefrom the zones impressioned by the light and accordingly non-resistant, in order to uncover, in correspondence with these zones, the underlying layer 55 of $SiO_2$, as illustrated in FIG. 3*a*—section (c).

Later, the wafer 51 is subjected to an etching operation, the object of which is to remove, in correspondence with the areas not protected by the upper layer 53 of photoresist, the surface thickness 55 of $SiO_2$, in order to uncover the underlying silicon part.

Typically this etching operation to remove the $SiO_2$ is effected in a liquid bath, or at any rate in a humid environment, and accordingly is also often called "wet etching" or "wet". Then the external layer 53 of photoresist is removed. In this way the layer 55 of $SiO_2$ forms the protective mask for the successive operation of etching the silicon constituting the wafer 51.

According to a variant of the process described up to now, the starting wafer may be exempt, on its faces, of the surface layer of $SiO_2$, and therefore consist solely of pure silicon. In the latter case, the layer of photoresist is deposited directly on the silicon of the wafer and subjected to the same operations of illumination, development, and removal already described in relation to the previous case of the wafer with oxidised surface, in order to form a protective mask for the subsequent step of etching the silicon of the wafer, which is exactly equivalent to that performed through the layer of $SiO_2$, relative to the earlier case. For simplicity' sake, only the case of the wafer 51 provided with the two surface layers of $SiO_2$ is depicted in FIG. 3.

In both the cases described above, after formation of the protective mask for the silicon of the wafer 51, as said, either through the layer of $SiO_2$, or through a layer of photoresist, the wafer 51 is subjected to one or more further etching operations, which have the purpose of selectively removing the silicon of the wafer 51 down to a given depth, in order to form the chamber 20 and the inlet duct 22, of the hydraulic circuit 21, which are present on the nozzle plate 12.

This etching step, shown in FIG. 3*a*—section (d), is performed by means of appropriate equipment in a vacuum environment, where the wafer 51 is subject to the action of agents in the gaseous or plasma state which combine with the non-protected silicon of the wafer 51, corroding it and removing it down to the desired depth.

Therefore, by contrast with the etching step previously referred and performed in a humid environment, or "wet etching", this etching step is often referred to as "dry etching".

For example, in this step the wafer 51 is hollowed for a depth of approx. 10□□25□m, in order to form a recess 54 made of two portions 54*a* and 54*b*, corresponding respectively to the chamber 20 and to the inlet duct 22, in which the portion 54*a* has a roughly square plan shape.

Subsequently, a thick layer 56 of negative photoresist, consisting for instance of SU8 type negative photoresist, from the name of its producer, is deposited, in a known process, along the entire extension of the unstuck side 51*a* of the wafer 51, in order to completely cover the recess 54 as well. Indicatively this layer 56 is approximately 15÷30 μm thick, permitting it to cover the step defined by the recess 54.

It is emphasised that this negative photoresist constituting the layer 56 has the opposite behaviour to that of the positive photoresist constituting the previous layer 53, and therefore under normal conditions it may melt in contact with certain substances, whereas, if illuminated, it acquires a certain resistance to these substances.

Figure 3B:
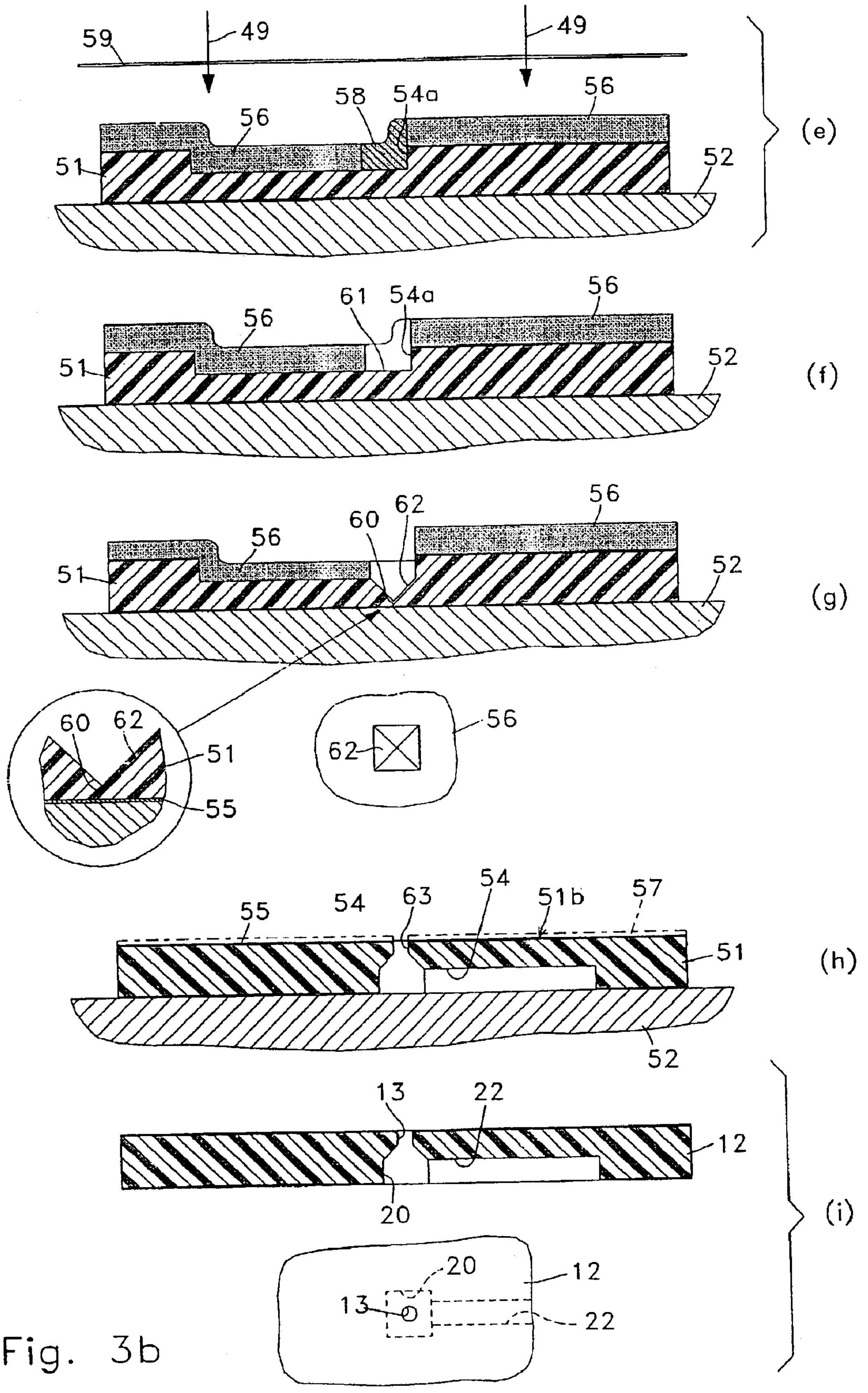

Then, as illustrated in FIG. 3*b*—section (e), this thick layer 56 is illuminated, through a given mask 59, so as not to receive the light 49 in correspondence with that portion of the same layer 56 indicated with the numeral 58 and having a square shape in plan view, which fills the portion 54*a* of the recess 54, corresponding roughly to the chamber 20.

Later, as illustrated in FIG. 3*b*—section (f), the layer 56 of negative photoresist is developed and hollowed, using known techniques, in order to remove the non-illuminated portion 58 and thereby delimit, along the bottom of the recess 54, adjacent to the chamber 20, a confined area 61, of square shape and not protected by the layer 56, corresponding to the zone of the nozzle 13 that will be formed.

At this point, as illustrated in FIG. 3*b*—section (g), the wafer 51 is subjected to another etching process, the object of which is to hollow the silicon of the wafer 51 only in correspondence with the confined, square area 61, defined on the bottom of the recess 54.

This is a wet etching, being performed in a damp environment for example using a compound such as KOH, and is also called anisotropic, as it is developed on the crystallographic axes of the silicon constituting the wafer 51.

In particular, this etching causes the formation of a blind hole 62, of pyramid shape, as illustrated in the plan view of FIG. 3*b*—section (g).

In greater detail, taking into account the side of the uncovered square area 61, of the thickness, of approximately 50 □m, of the silicon wall to be etched, and of the incline, of roughly 54° of the crystallographic axes of the silicon, the etching is conducted in such a way as to form in the wall a pyramid-shaped blind hole 62, leaving a thin residual layer of silicon, indicated with the numeral 60, at the bottom of the blind hole 62.

At this point, after the thick layer 56 of photoresist has been removed, the wafer 51 is unstuck, along the side 51*b*, from the carrier 52, cleaned and then stuck again, this time on the opposite side 51*a* of the same carrier 52 or on another similar carrier.

Subsequently, as illustrated in FIG. 3*b*—section (h), the wafer 51 is covered on the side 51*b*, now free, with a layer 57 of positive photoresist, represented with the dot and dash line, which is later illuminated with a suitable mask, impressioned and developed, with the same techniques as already seen earlier, in such a way as to protect the entire extension of the layer 55 of silicon dioxide $SiO_2$ arranged-along the side 51*b*, with the exception of a limited circular area adjacent to the wall 60 and corresponding to the nozzle 13.

The wafer 51 is then subjected to another "wet" etching process, i.e. in a chemical bath, to remove the circular, unprotected area of the layer 55 of silicon dioxide $SiO_2$, and uncover an underlying and corresponding circular zone of the silicon of the wafer 51.

In this way, the layer 55 forms a protective mask for the silicon of the wafer 51 during the subsequent dry etching operation.

Naturally if originally the wafer 51 was not provided with the layer of $SiO_2$, this protective mask is made with a layer of photoresist, in the same way as already seen earlier.

In particular, in this case, the layer of photoresist is selected with a suitable thickness, in relation to the thickness of silicon to be etched in the following step, to permit a correct conduction of this etching step.

Then, in a dry type etching process, the circular uncovered area of the silicon of the wafer 51, i.e. not protected by the layer 55, is etched, in such a way as to hollow the wall 60 and form in it a pass-through hole 63 corresponding to the nozzle 13.

Finally the wafer 51 which, it will be recalled, has undergone the operations described earlier for each of its elementary areas, is cut into single units corresponding to these areas, and each constituting a nozzle plate 12.

Following this, the single nozzle plates 12 are washed and inspected to check that they do not contain defects, and that they have been formed correctly In this way, from the wafer 51, the structure is obtained that constitutes the nozzle plate 12, which is shown in FIG. 3*b*—section (i), both in lateral section and in plan view.

The process 32 for manufacturing the substrate 11 in large part follows a known sequence and employs technologies that are also known, and will not therefore be described in detail.

It is recalled simply that this process 32 starts with the availability of a carrier or wafer of silicon 70, similar to the one used for manufacturing the nozzle plate 12, but of significantly greater thickness, for example 0.5 mm, and has the object of making on the carrier 70, as well as the actuator 15, certain protective layers having the function of protecting the actuator 15 itself so as to prolong its working life.

In the process 32, a suitable track, or tracks, are also made, for the electric connection of the actuator 15 with the circuits arranged for driving it.

In particular, as anticipated above, the process 32 may also include the production, on the silicon wafer 70, of specific auxiliary circuits, often called "drivers", suitable for being conditioned by the control unit 19 for generating the pulses to be sent directly to the actuator 15 for activating ejection of the droplets 16.

In the same way as the nozzle plate 12, and with the purpose of creating economies of scale and improving the efficiency of the productive cycle of the substrate 11, a single wafer of silicon 70 may be used to simultaneously produce a plurality of substrates 11, each identical and corresponding to an elementary area or portion of the original silicon wafer 70.

Figure 4:
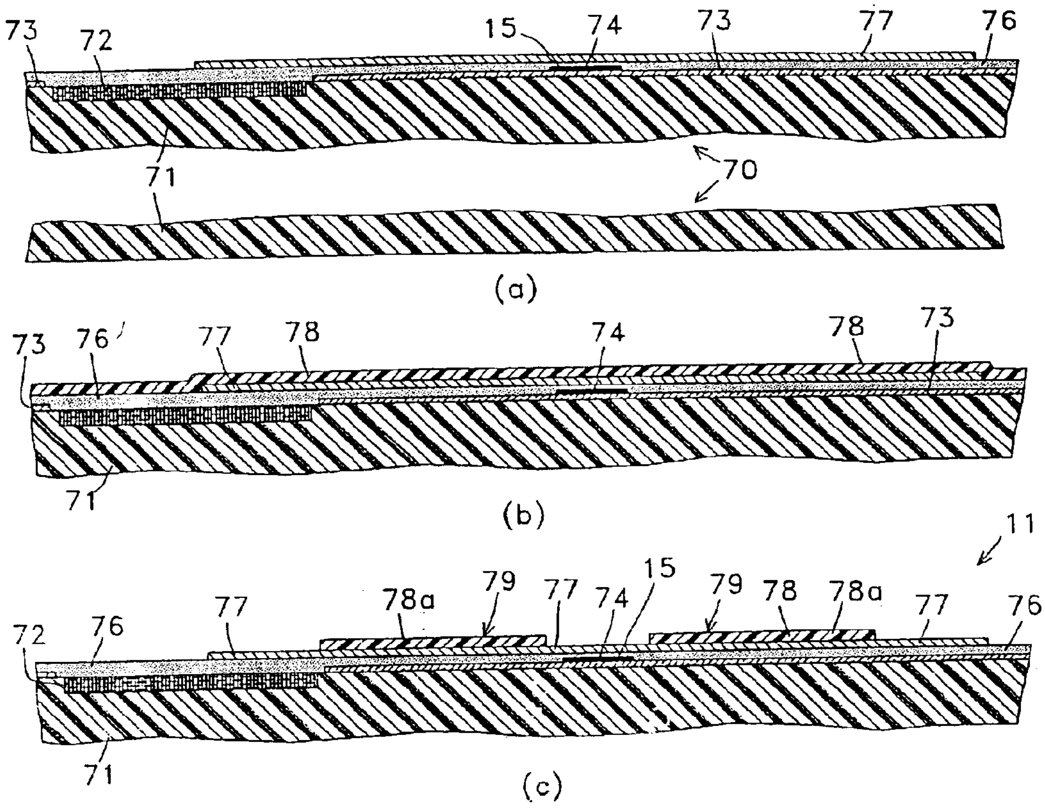
FIG. 4—(section a–c) is a sectional view illustrating the final steps for making the structure of a substrate bearing an actuator of the ejection head of FIG. 1.

For clarity's sake, the structure of the substrate 11 which is produced via the known operations mentioned above and which corresponds to an elementary portion of the wafer 70 is represented in FIG. 4—section (a).

In particular, this structure comprises a base layer 71 of silicon corresponding substantially to the thickness of the initial starting wafer 70; a zone 72, made in MOS technology, which comprises a series of circuits or drivers for controlling operation of the ejection head 10; a thin layer 73 of silicon dioxide $SiO_2$ selectively grown on the layer of silicon 71, and in particular lacking along the zone 72 with the MOS circuits; a thin resistive film of limited extent or resistor 74, constituting the actuator 15; one or more tracks, not shown on the drawings and extending in the normal direction to the plane of FIG. 4, for electrically connecting the resistor 74 to the circuits of the zone 72; a protective layer 76 made of silicon nitride and silicon carbide and deposited on the resistor 74; and a layer 77, made of tantalum Ta, arranged over the nitride/carbide layer 76 in the area of the resistor 15.

The layer 77 of Ta has essentially the function of protecting the resistor 74 against wear caused by the mechanical stresses to which the resistor 74 is subjected, during operation of the ejection head 10.

Typically these stresses are caused by the phenomenon of cavitation that occurs due to the pumping effect of the liquid 14, caused by the resistor 74, for ejecting the droplets 16.

As will be seen more clearly below, this layer 77 of tantalum is arranged for also being used advantageously during the successive operation of joining the substrate 11 with the nozzle plate 12, to form the ejection head 10, and to this end the layer 77 of tantalum is deposited on the silicon wafer 70 in order to cover not only the area of the resistor 74, but to extend laterally along the zone where the junction will be made.

Also, to this same end, the layer 77 is formed in such a way as to have, along its edge, a portion 77*a*, which is disposed externally with respect to the junction zone Differently from the known art and with the purpose of arranging the substrate 11 for the next operation, described below, of-joining with the nozzle plate 12, the structure of the substrate 11 also comprises, along given junction zones, an outer surface layer 78 of borosilicate glass, deposited on the layer 77 of tantalum.

As illustrated in FIG. 4—section (b), this layer 78 of borosilicate glass is initially deposited continuously on all the areas of the original wafer 70, in order to completely cover the layer 77 of tantalum provided on these areas.

More particularly, the layer 78 is of a thickness of between 1÷5 μm, and is made of Pyrex 7740, or Schott 8329 borosilicate glass, containing ions of sodium and lithium, with thermal expansion coefficient of $2.3*10^{6}K^{-1}$ and therefore very close to that of the silicon which is of $2.3*10^{6}K^{-1}$.

Accordingly the layer 78 of borosilicate glass and the silicon of the wafer 70 mate together optimally without causing the occurrence of mechanical stresses in the junction area.

Deposition of the outer layer 78 of borosilicate glass on the substrate 11 is performed in a known way, for instance by way of the process known as "RF sputtering", in which the borosilicate glass is atomized and sprayed on the substrate 11.

The layer 78 may also be deposited by way of the process known as "electron-beam evaporation", in which an electronic ray is radiated upon an electrode consisting of borosilicate glass, so that the borosilicate glass evaporates and is deposited on the substrate 11.

With respect to sputtering, the electron-beam evaporation process has the advantage of being faster, i.e. of being able to deposit a greater quantity of material per unit of time, and in addition of being able to ensure a greater stechiometric control of the deposited layer 78 of borosilicate glass.

This continuous layer 78 of borosilicate glass is then etched with known techniques in order to uncover the area of the resistor 74, and to restrict the layer 78 to the area of the substrate 11 intended for coupling with the nozzle plate 12.

In this way, the layer of borosilicate glass 78 forms a kind of frame around the resistor 74. To this end, the continuous layer 78 is first covered with a layer of positive photoresist, which is then selectively illuminated, and finally removed in correspondence with the illuminated zones, in order to define a protective mask for the underlying layer 78.

Later, again with known techniques and for instance by way of a dry etching step, the layer 78 of borosilicate glass is removed along the areas not protected at the top by the photoresist.

Accordingly the structure depicted in FIG. 4—section (c) and which constitutes the substrate 11 is obtained.

Naturally, where a single original wafer 70 is used to produce numerous substrates 11, this structure is duplicated into the various elementary areas of the silicon wafer 70.

In short, this structure comprises by way of example a residual layer 78*a* of borosilicate glass, which is obtained from selective etching of the original continuous layer 78 and is disposed laterally with respect to the resistor 74, in order to uncover the portion of the layer 77 of tantalum which protects the resistor 74, and to also define a junction or soldering surface 79 for the coupling of the substrate 11 with the nozzle plate 12.

In order to ensure the best results during the subsequent step of joining the substrate 11 with the nozzle plate 12, step which is carried out by means of the anodic bonding technology as will be described in detail below, preferably the layer 78 of borosilicate glass is subjected to a planarization operation along the free surface intended for coupling with the nozzle plate 12.

The object of this operation is to reduce to a minimum roughness of the surface of the layer 78 and it is carried out, for instance, using a planarization process called CMP, or "Chemical-Mechanical Polishing".

In fact, as is known, the anodic bonding process requires an exceptional degree of planarity of the surfaces that have to be coupled by means of this process.

Unfortunately the wafer 70, during the operations for forming the substrate 11, which precede the depositing of the layer of borosilicate glass 78, inevitably acquires a certain degree of roughness, which the same layer 78 of borosilicate glass necessarily reproduces and amplifies.

Therefore the CMP planarization process has the object of remedying this progressive increase in roughness of the wafer 70, ensuring a very high degree of planarity of the surface of the layer 78 of borosilicate glass intended for contact coupling with the nozzle plate 12.

In particular, this CMP process may be carried out following application of the continuous layer 78 of borosilicate glass, and before its etching to define the residual layer 78*a* and the corresponding junction surface 79.

As anticipated above, and according to a characteristic of this invention, the plate 12 with the nozzle 13 and the substrate 11, after being manufactured separately from one another as described earlier, are joined permanently in a joining process based on the anodic soldering technology, frequently also called "anodic bonding".

For information, it is pointed out that anodic bonding constitutes a joining technology which has been developed and perfected in recent years, and which at present is being applied to an ever greater extent in numerous sectors of the art, in particular in the field of microstructures, also abbreviated MEMS standing for "Micro ElectroMechanical Systems", for the purpose of achieving a stable and efficacious junction between two parts making up a microstructure.

For instance this joining technology based on anodic bonding is used to advantage to structurally join together two silicon wafers, in which case it is also known as "silicon-to-silicon anodic bonding".

As is known, the anodic bonding technology is employed to join two surfaces having a high degree of planarity, and is based essentially on the principle of putting the two surfaces to be joined into reciprocal contact at a suitable pressure and temperature, and of then applying a certain potential to them.

In this way, in fact, the junction zone becomes the seat of opportune electrostatic charges tending to reciprocally attract and co-penetrate the molecules of the two surfaces, so as to produce a structural cohesion between the two.

Often this technology requires that the surfaces intended to be contact coupled be adequately prepared, for instance by means of depositing on at least one of them a suitable layer of material.

Further, as already said, this technology also requires the two surfaces to be coupled to be extremely flat and without roughness, i.e. mating perfectly along the zone of contact, so that the phenomenon of co-penetration and structural cohesion between the respective molecules can take place.

Further details and information about the anodic bonding technology may be obtained in the following publications, quoted below by way of reference:

"Field Assisted Glass-Metal Sealing", published on page 3946, of volume 40, No. 10, Sep. 1969, of the magazine "Journal of applied physics";

"Fabrication of a silicon-Pyrex-silicon stack by a.c. anodic bonding" published on page 219 et seq, of No. A 55, 1996, of the magazine "Sensors and Actuators";

"Anodic bonding technique under low temperature and low voltage using evaporated glass", published in Vol. 15, No. 2, March/April 1997, of the magazine “Journal of Vacuum Science Technology”;

“Silicon-to-silicon wafer bonding using evaporated glass”, published on page 179 et seq, of No. A 70, 1998, of the magazine “Sensors and Actuators”.

Figure 5:
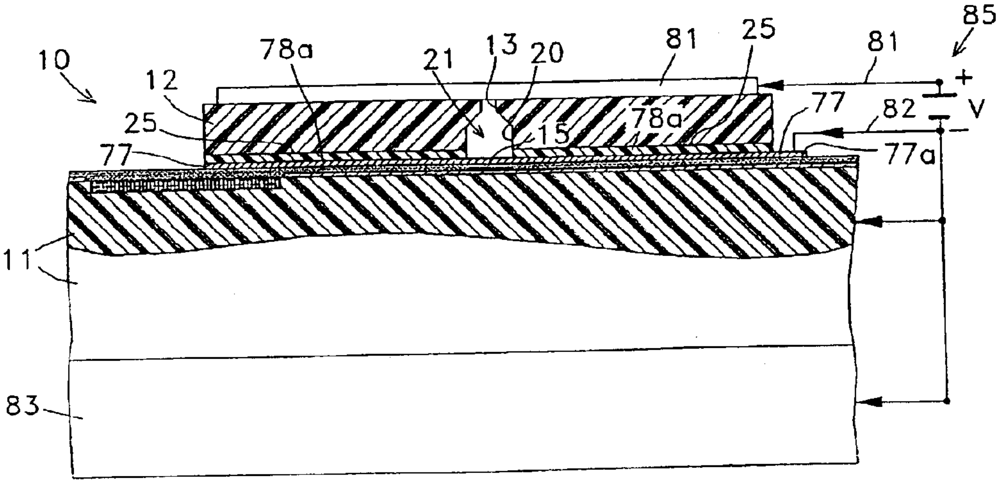
FIG. 5—is a working diagram relating to a mounting operation, performed by means of the "anodic bonding" type technology, for soldering the nozzle plate of FIG. 3 to the substrate of FIG. 4.

For completeness, FIG. 5 schematically represents the step of joining the nozzle plate 12 with the substrate 11 using the anodic bonding technique, and the anodic bonding equipment or machine, generically indicated with the numeral 85, used to make the junction.

In particular, the anodic bonding equipment 85 comprises two counter-electrodes, generically indicated with the numerals 81 and 82, adapted for working respectively as the anode and the cathode in the anodic bonding step. In detail, initially the nozzle plate 12 and the substrate 11 are arranged in reciprocal contact on the smooth surface 79 defined by the layer of borosilicate glass 78*a*, and in addition aligned with precision with respect to one another. Thus, during a punching operation, the nozzle plate 12 and the substrate 11 are temporarily connected one to the other, for instance with a laser ray, or by means of a suitable adhesive, so that they are held together, at least until the definitive junction is made. Then the assembly formed by the nozzle plate 12 and the substrate 11 is loaded on the anodic bonding machine 85, setting the substrate 11 on a heating element 83 the object of which is to heat and maintain the substrate 11 at a temperature between 200 and 400° C., during the anodic bonding.

Moreover, the assembly formed by the nozzle plate 12 and the substrate 11 is disposed on the bonding machine 85 setting the anode 81 of the latter on top of the nozzle plate 12, with a certain pressure, and also electrically connecting the cathode 82 of the anodic bonding machine 85 with the portion 77*a*, of the tantalum layer 77, which extends to the outside of the zone of contact between the substrate 11 and the nozzle plate 12. In particular, the anode 81 is plate-shaped so as to practically cover the nozzle plate 12 over its entire extent.

The cathode 82 of the bonding machine 85 is also connected to the main layer of silicon of the substrate 11, and to the heating element 83, to keep them at the same potential during the bonding operation. At this point, the anodic bonding machine 85 applies, for instance during a period of 15 minutes, a potential defined by a voltage V, of indicatively between 50 and 500 volt, between the anode 81 and the cathode 82, thus activating that phenomenon called, as already stated, anodic bonding which gives that structural cohesion between the borosilicate glass of the layer 78*a* and the silicon dioxide $SiO_2$ on the surface of the nozzle plate 12.

As tantalum is conductive, the layer 77 operates in this anodic bonding step as a cathode plate true and proper which distributes the potential difference generated by the anodic bonding machine 85 through the junction zone, so that the bonding assumes uniform characteristics over its full extent.

Accordingly the substrate 11 and the nozzle plate 12 are joined permanently and structurally through a junction, indicated with the numeral 25 which extends along a corresponding junction zone defined by the layer 78*a* of borosilicate glass deposited on the substrate 11.

In this way, the ejection head 10 is formed, with the relative internal hydraulic circuit 21 intended for conveying the liquid 14 inside the ejection head 10.

The ejection head 10 manufactured in the above way with the junction 25 presents numerous and important innovative aspects with respect to the known way.

First and foremost, unlike what happens in the known art, the substrate 11 and the nozzle plate 12 of the ejection head 10 are bound closely together in a joining process that does not involve the use of additional substances, such as binders or other compounds, generally of the organic type, liable to cause a certain structural discontinuity in the junction zone.

In fact, the anodic bonding technology, via which the junction 25 is produced, is characterized precisely by its ability to produce a complete continuity and structural co-penetration between the materials of the parts that are being joined, in the specific case between the silicon of the nozzle plate 12 and the borosilicate glass deposited on the substrate 11.

In particular, the structure of the ejection head 10 obtained through this method does not present, either in the parts that comprise it, or on the junction 25, organic type substances, or other similar materials, so that the ejection head 10 can advantageously be employed, without suffering damage, such as for instance corrosion, and/or unsticking, which would compromise its operation, even with liquids that are especially aggressive vis-a-vis organic compounds.

As a general concept, it may be said that the ejection head 10 of the invention is characterized by the fact of comprising, between the nozzle plate 12 and the substrate 11 bearing the ejection actuator 15, a junction 25 which has the property of being substantially inert from the chemical point of view.

In other words, this junction 25, in relation with the liquid 14 contained in the hydraulic circuit 21 of the ejection head 10 and thereby wetting the zone of the same junction 25 in being ejected in droplet form by the ejection head 10, possesses special properties of resistance to chemical corrosion by the liquid 14, and also of non combining chemically with the latter, which are at least equal and equivalent, and at any rate not inferior, to those of the materials, in particular silicon, and/or of the parts that comprise the structure of the nozzle plate 12 and of the substrate 11, and which are also wetted by the liquid 14.

Figure 6:
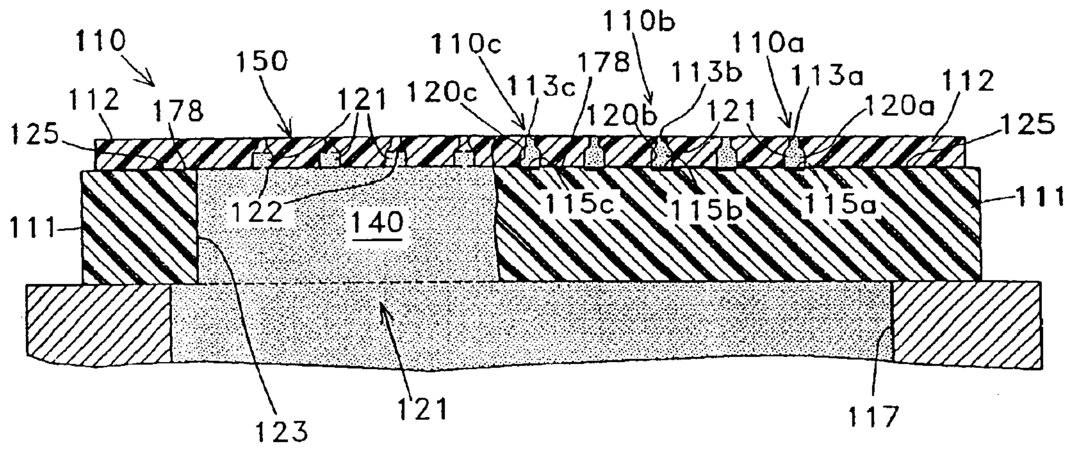
FIG. 6—shows a first example of application of the invention concerning a printhead provided with multiple nozzles and suitable for ejecting droplets of ink.

Description of a First Example of Application of the Invention for Producing an Ink Jet Printhead FIG. 6 shows in section view an ink jet printhead, indicated generically with the numeral 110 and suitable for being fed with ink 140, which is produced in accordance with the method of the invention. Where possible, the parts of the printhead 110 corresponding to those of the ejection head 10 are indicated with reference numerals incremented by 100 with respect to the ejection head 10.

In particular, the printhead 110 comprises a nozzle plate 112 and a substrate 111, also called “die”, which are made separately from one another and then joined permanently together via a junction 125, in a similar way to the manufacturing process described in connection with the ejection head 10. More particularly, the junction 125 is manufactured with the anodic bonding technology, after appropriately preparing the substrate 111 by depositing on it a layer 178 of borosilicate glass.

The substrate 111 and the nozzle plate 112 define a plurality of ejection units, indicated with numerals 110*a*, 110*b*, 110*c*, etc., which are arranged along an ejection side 150 of the printhead 110 and have, each one, a structure corresponding to that of the ejection head 10.

Each ejection unit 110*a*, 110*b*, 110*c*, etc., comprises a respective nozzle, indicated in order with numerals 113*a*, 113*b*, 113*c*, etc., a respective actuator 115*a*, 115*b*, 115*c*, etc. and a respective ejection chamber 120*a*, 120*b*, 120*c*, etc.

The printhead 110 is also provided internally with a hydraulic circuit 121 the function of which is to feed the ink 140 from a single tank 117 to the different ejection units 110*a*, 110*b*, 110*c*, etc., and which comprises, in addition to the chambers 120*a*, 120*b*, 120*c*, etc., a plurality of inlet ducts 122, each communicating with a respective ejection chamber 120*a*, 120*b*, 120*c*, etc., and a central slot 123 made through the substrate 111.

In particular, the central slot 123 communicates at one end with the tank 117, and at the opposite end with the plurality of inlet ducts 122, which in turn are arranged both on one side and the other of the slot 123 in order to put the slot 123 in communication with the ejection chambers 120*a*, 120*b*, 120*c*, etc. of the different ejection, units 110*a*, 110*b*, 110*c*, etc.

In this way, the ink 140 can flow from the tank 117 to each single ejection unit 110*a*, 110*b*, 110*c*, etc. through the hydraulic circuit 121. As already intimated, the method for manufacturing the printhead 110 is substantially similar to that for manufacturing the ejector 10.

Again in this case, with a view to improving efficiency oft the industrial mass production of these printheads 110, a single silicon wafer may be used in order to produce multiple substrates 111 and also to produce multiple nozzle plates 112, with obvious advantages in terms of industrial production at lower costs.

Figure 7:
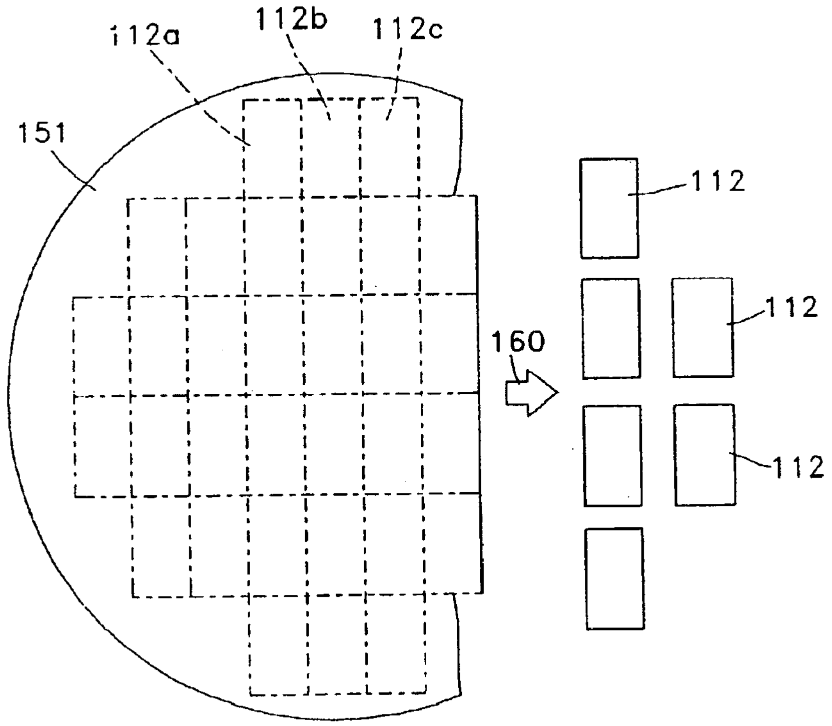
FIG. 7—illustrates a silicon wafer used for manufacturing a plurality of nozzle plates of the printhead of FIG. 6.

In detail, as shown schematically in FIG. 7, multiple nozzle plates 112, corresponding to elementary portions 112*a*, 112*b*, 112*c*, etc., of an original silicon wafer 151, are produced together on the original silicon wafer, in the steps described with reference to the nozzle plate 12, so as to form for each nozzle plate 112 the respective ejection chambers 120*a*, 120*b*, 120*c*, etc. and the respective nozzles 113*a*, 113*b*, 113*c*, etc.

Finally, in accordance with what is indicated by the arrow 160, this wafer 151 is cut or singularized into units each of which constituting a nozzle plate 112.

Figure 8:
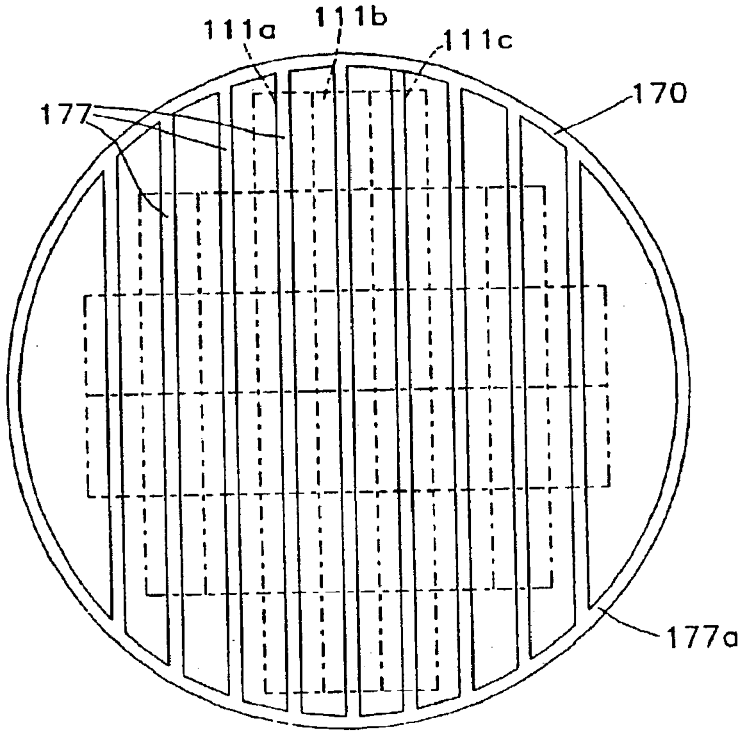
FIG. 8—illustrates another silicon wafer used for manufacturing a plurality of substrates of the printhead of FIG. 6.

Similarly and as illustrated in FIG. 8, multiple substrates 111, each corresponding to an elementary portion 111*a*, 111*b*, 111*c*, etc., of a single original silicon wafer 170, are simultaneously formed on the latter in the steps already described with reference to the substrate 11.

In particular, these elementary portions or areas 111*a*, 111*b*, 111*c*, etc. of the silicon wafer 170 are subjected to a series of operations in order to produce, in correspondence with each of these, a structure of the type depicted in FIG. 4—section (c), with a layer of borosilicate glass 178 defining a junction zone for the next anodic bonding operation.

Conveniently, for the purpose of preparing the silicon wafer 170 for the subsequent joining operation with anodic bonding, the conductive layers of tantalum in the areas 111*a*, 111*b*, 111*c*, etc are interconnected to one another and to a conductive ring 177*a* made along the edge of the wafer 170, so as to form, on the surface of the wafer 170, a mesh 177, also called equipotential mesh or network on account of its ability to keep the elementary areas 111*a*, 111*b*, 111*c*, etc. at a same potential during joining with the nozzle plates 112.

An equipotential network of the type of the mesh 177 is described in the Italian patent application No. TO99A000987, filed on Nov. 15, 1999 on behalf of the Applicant, the said application being cited here for reference for all details, not found in this description, of the configuration and characteristics of the mesh 77.

In this way, the silicon wafer 170 acquires a structure which encompasses a plurality of elementary areas 111*a*, 111*b*, 111*c*, etc., each corresponding to a substrate 111, which are already prepared for joining with the respective nozzle plates 112.

Then the single nozzle plates 112 which, as already said, have been made separately, are mounted, aligned, and temporarily affixed, one by one, on the different elementary areas 111*a*, 111*b*, 111*c*, etc., defined on the silicon wafer 170 and therefore still permanently interconnected to one another. At this point, it is possible to proceed with the anodic bonding step true and proper, in which each nozzle plate 112 is joined with the corresponding elementary area 111*a*, 111*b*, 111*c*, etc. of the silicon wafer 170, by applying a given potential between the same using an appropriate anodic bonding machine.

In order to permit a correct locating of the anode on the different nozzle plates 112 and therefore optimal bonding thereof with the respective areas 111*a*, 111*b*, 111*c*, etc. of the silicon wafer 170, this anodic bonding machine has a specially modified anode, divided in particular into a plurality of elements, each corresponding to a nozzle plate 112, which are mounted on a sprung structure that permits limited movements between one anode element and another.

In fact, in this way, each of these anode elements is capable of adapting, independently from the others, to the corresponding nozzle plate 112, so as to set perfectly on the latter with the right pressure, when the anode of the anodic bonding machine is brought globally into contact against the various nozzle plates 112.

In turn, the cathode of the bonding machine is brought into contact, possibly at numerous points, with the outer conducting ring 177*a*, to which the various layers of tantalum, forming the mesh 177 and arranged on the elementary areas of the silicon wafer 170 are connected.

In this way, all these layers of tantalum are brought to and maintained at the same potential, in the anodic bonding step.

In particular, this anodic bonding step consists, as stated earlier, in putting into reciprocal contact at a given pressure and temperature each nozzle plate 112 with the respective area 11*a*, 111*b*, 111*c*, etc. and in applying a suitable potential between them, through the anode which presses with its elements on each nozzle plate 112, and the cathode which is connected via the mesh 177 to the tantalum layers arranged on each area 111*a*, 111*b*, 111*c*, etc.

Accordingly, that close structural cohesion, typical of the anodic bonding technology, is achieved between each nozzle plate 112 and the corresponding elementary area 111*a*, 111*b*, 111*c*, etc. of the silicon wafer 170.

Finally, after the junction has been made, the silicon wafer 170 is cut or singularized into single blocks, each of which formed by a nozzle plate 112 and a substrate 111 permanently and structurally interconnected, and constitutes an ejection assembly suitable for being subsequently assembled with a tank for forming a printhead 110 such as the one shown in FIG. 6.

The method of the invention can be used for producing a printhead capable of working with inks decidedly more aggressive than those neutral ones, generally water or alcohol based, used on traditional ink jet heads. In fact, the so-called aggressive inks, while fully innocuous in relation to the head of the invention, are capable, if used with traditional printheads, of irreparably damaging the structure in a very short time, particularly in the junction zone or zones between the parts that comprise the traditional printheads, these junctions, as is known, being made with substances easily attacked by and/or combinable with these aggressive inks. Furthermore, this method which adopts the anodic bonding technology has the additional advantage over the traditional methods of involving the occurrence of lesser heat expansions and in general lesser deformation during the joining step between the nozzle plate and the substrate, both of silicon, in forming the ink jet printhead.

On the contrary, with the traditional method, the nozzle plate and the substrate, as also the hydraulic circuit are normally made of different materials, such as for example: metal, silicon, and plastic, so that these parts, when connected together to form the printhead, may give rise to reciprocal deformations likely to have a negative influence on manufacturing precision of the printhead.

Therefore, in short, the method of the invention enables compliance to be guaranteed with extremely low manufacturing and assembly tolerances, and accordingly decidedly much higher production precision levels to be reached than with the traditional method.

Description of a Second Example of Application of the Invention Concerning an Injector for Internal Combustion Engines FIG. 8 illustrates schematically an application in which the ejection head of the invention constitutes a fuel injector for an internal combustion engine, indicated generically with the numeral 200, and comprising at least one cylinder 201 with a piston 202 and a combustion chamber 203; an inlet duct 204 bringing fresh air to the combustion chamber 203, and an exhaust duct 206 for the fumes from the combustion chamber 203.

Figure 9:
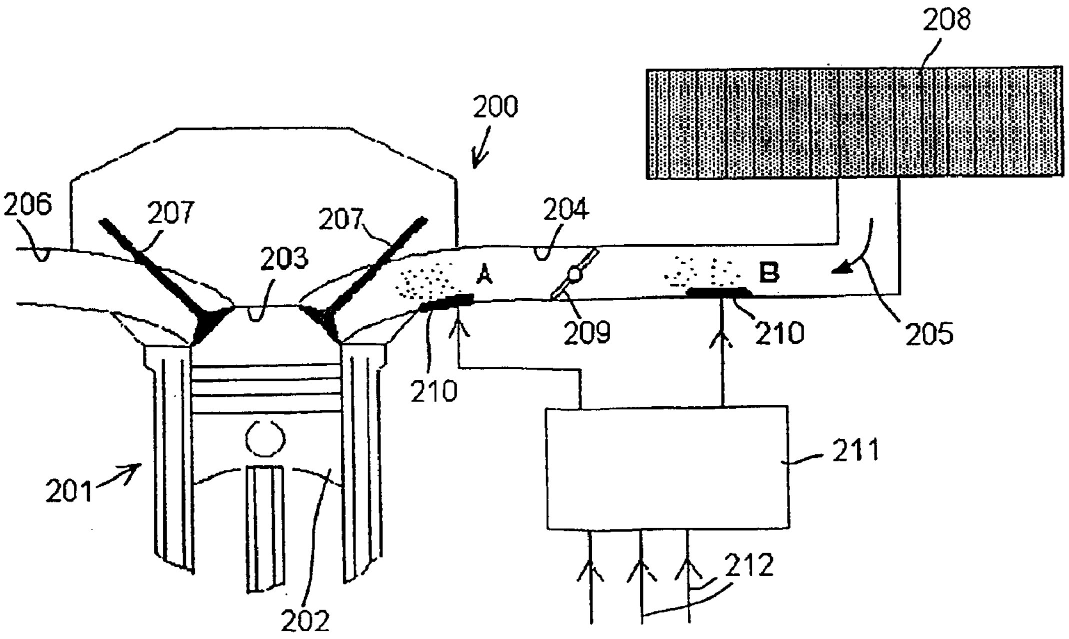
FIG. 9—demonstrates a second example of application of the ejection head made with the method of the invention, in which the ejection head is arranged for ejecting droplets of fuel in an internal combustion heat engine.

For simplicity's sake, a single cylinder 201 is depicted in FIG. 9, even if it is clear that the engine 200 may comprise multiple cylinders, according to types widely known in the art.

A valve 207 is disposed in correspondence with the outlet zone of each of the ducts 204 and 206 in the combustion chamber 203, for the purpose of excluding or otherwise the flow of air to and the flow of fumes from the latter-named. The inlet duct 204 is suitable for receiving the air from a filter zone 208, where the fresh air is suitably filtered, and accommodates on its inside a butterfly valve 209 with the function of controlling the flow of filtered air in the direction of the arrow 205 towards the combustion chamber 203.

The injector, indicated with the numeral 210, has the function of ejecting droplets of fuel, such as petrol or diesel, in the inlet duct 204, in quantities controlled exactly by a control unit 211, associated with the ejector 210, so as to form with the filtered air coming from the filter zone 208 an air-fuel mix which feeds the combustion chamber 203.

In particular, the optimal quantities of fuel to be injected in droplet form are determined by the control unit 211 on the basis of data sent to the latter, on lines 212, by suitable sensors in the engine.

The injector may be mounted in the position indicated with the letter A, after the butterfly valve 209, in the case of Multipoint injection (or MPI, "Multi Point Injection", i.e. with one injector for each cylinder; or also alternatively in the position indicated with B, before the butterfly valve 209, in the case of Single Point injection (SPI), i.e. with a single injector generating the air-fuel mix which is then shared between the cylinders. In the latter case, the air inlet duct divides into numerous ducts corresponding to the cylinders of the engine, immediately after the butterfly valve 209.

In this way, the injector 210 of the invention permits to dose with great precision the quantity of fuel delivered to the cylinder, or cylinders, of the engine, so as to obtain better performances from the engine, such as for example a higher thermal efficiency, than the traditional engines.

Furthermore the injector has a particularly robust structure, suitable for resisting efficaciously the system of thermal and mechanical stresses and the corrosive actions of a chemical nature depending on the fuels used, typically present in internal combustion engines.

Other Possible Applications of the Injection Head According to the Invention The forms of application of the ejection head manufactured in accordance with this method are not limited to those described above.

In fact, this ejection head, by virtue of its chemically inert structure in the junction zone between the actuation support and the nozzle plate, is suitable for being used in multiple sectors which require precise injection of special liquids, sometimes specifically developed for these sectors, and decidedly more aggressive from the chemical viewpoint than the inks, both water-based and even alcohol-based, which are usually employed for printing on paper media with the conventional ink jet printheads.

One particular example that springs to mind is the industrial marking field in general, in which this ejection head could be used to advantage for ejecting liquids, such as special paints or inks, capable of adhering stably also to non-paper media, such as plastic or metallic laminates, in order to produce particular markings on these media.

For example, the ejection head could be used for making custom images on plastic media, such as those generically designated with the word "badge", or on numerous consumer products, such as skis, helmets, tiles, gift objects, and still others. In fact, the liquids currently used for these marking applications, and probably also those that will be developed in the future, are incompatible with use on the traditional printheads, since they are prepared with substances or solvents which would irreparably damage the structure of the traditional heads, whereas on the contrary these could be employed without any drawback on this ejection head.

Purely by way of example, quoted below are some types of solvents which already today are of wide scale application in products such as fuels, paints and printing inks, and which could be used for preparing liquids to be used, without drawbacks, in combination with the ejection head of the invention, thanks to the latter's chemically inert structure:

aliphatic and aromatic hydrocarbons such as: liquid paraffins, toluene, xylene;

aliphatic and aromatic alcohols such as: methyl alcohol, isopropyl alcohol, n-propyl alcohol, sec-butyl alcohol, isobutyl alcohol, n-butyl alcohol, benzyl alcohol, cyclohexanol;

esters such as: methyl acetate, ethyl acetate, isopropyl acetate, n-propyl acetate, sec-butyl acetate, isobutyl acetate, n-butyl acetate, amyl acetate, 2-ethoxy ethyl acetate;

glycol esters such as: 2-methoxyethanol, 2-ethoxyethanol, 2-butoxyethanol;

ketones such as: acetone, methy ethyl ketone, methyl isobutyl ketone, methyl isoamyl ketone, cyclohexanone;

lactones such as: 6-caprolactone monomer.

Another possible application of this ejection head is that of microdosing, in particular though not exclusively in the biomedical sector. In fact, this ejection head, thanks to its chemically inert structure without organic substances, may be used without drawbacks for ejecting and dosing a vast range of liquids used in the medical field, for instance organic liquids in general and more particularly liquids containing urea, or liquids such as insulin, or still other medical liquids which need to be dosed with special precision in certain medical functions. Even use of this ejection head for ejecting in a controlled manner edible liquids, i.e. foodstuffs, may be numbered among the possible forms of application of the invention. In general, it may be said that this ejection head has a chemically inert structure which, as well as the advantage of not being subject to corrosion by a vast range of liquids used in the medical field, has the further advantage of not combining with these liquids, and therefore of not altering and offending even minimally the characteristics while they are maintained in this ejection head.

It remains understood that changes and/or improvements may be made to the method for manufacturing a head for ejecting a liquid in droplet form, as also to the ejection head manufactured in accordance with the method, described up to this point, without exiting from the scope of the invention.

What is claimed is:

1. Method for manufacturing an ejection head (10; 110), or ejector, suitable for ejecting a liquid (14; 140) in the form of droplets (16), and possessing internally a hydraulic circuit (21; 121) for containing and conveying said liquid (14; 140), comprising the following phases:

producing a nozzle plate (12; 112) having at least one ejection nozzle (13; 113*a*, 113*b*, 113*c*);

producing a substrate (11; 111) or actuation support having at least one actuator (15; 115*a,* 115*b,* 115*c*) for activating the ejection of said droplets (16) of liquid through said at least one nozzle (13; 113*a*, 113*b,* 113*c*); and integrally joining said nozzle plate (12; 112) and said substrate (11; 111) together to form said ejection head (10; 110) and the relative hydraulic circuit (21; 121), this joining phase comprising the production by means of the so-called "anodic bonding" technology of a junction (25; 125), between said nozzle plate (12; 112) and said substrate (11; 111), arranged for being wetted by said liquid (14; 140) contained in the hydraulic circuit (25; 125), wherein the phase of producing said nozzle plate (12; 112) includes the following steps:

providing a plate or wafer (51) made of silicon, selectively removing the silicon of said plate (51) down a given depth, so as to form, along a face (51*a*) of said plate, a recess (54) defining a chamber (20) of said hydraulic circuit (21), and forming, by means of an etching process and along a bottom (61) of said recess (54), said at least one ejection nozzle (13), wherein the phase of producing said substrate (11; 111) includes the following steps:

providing a plate of wafer (70, 71) made of silicon, forming, on an outer surface of said plate (11), said at least one actuator (15) and the tracks (72) for the electrical connection of it, depositing a first protective layer (76) on said at least one actuator (15), depositing a second protective and conductive layer (77) over said first protective layer (76), said second conductive layer (77) being arranged in the area of said at least one actuator (15) and in the junction zone where said substrate (11) will be joined together with said nozzle plate (12), and moreover forming a portion (77*a*) which extends, along said substrate (11), outside said junction zone, depositing a preliminary layer of glass (78) on said conductive protection layer (77), said preliminary layer having the purpose of preparing said substrate (11) for being joined with said nozzle plate (12) by means of said anodic banding technology, and subsequently etching said layer of glass (78) to uncover the zone of said actuator (15) and to define the junction areas (78*a*) between said substrate (11) and said nozzle plate (12), and wherein the joining phase includes the following steps:

positioning into reciprocal contact said nozzle plate (12; 112) of silicon and said substrate (11; 111), in correspondence of said layer of glass (78), in such a way to arrange exactly said at least one nozzle (13; 113*a,* 113*b,* 113*c*) in front of said at least one actuator (15; 115*a,* 115*b,* 115*c*), and affecting said junction (25) between said nozzle plate (12) and said substrate (11) by connecting said nozzle plate (12) and said portion (77*a*) of said conductive layer (77) respectively to a first (81) and a second counter-electrode (82) of an appropriate anodic bonding machine (85), and then applying by means of said machine (85) a determined voltage between said counter-electrodes (81, 82), said first counter-electrode (81) being formed of a plate which rests on said nozzle plate (12) along the side bearing said ejection nozzle (13) and acts as the anode during the production of said junction (25), whereas said second counter-electrode (82) acts as the cathode, whereby a structural cohesion is obtained between the two surfaces of silicon and of glass (78), in reciprocal contact, respectively of said nozzle plate (12) and of said substrate (11).

2. Method for manufacturing an ejection head according to claim 1, wherein said preliminary layer is made of borosilicate glass (78).

3. Method for manufacturing an ejection head according to claim 2, wherein said layer of borosilicate glass (78) is made of a material known as Pyrex containing sodium.

4. Method for manufacturing an ejection head according to claim 1, wherein the phase of producing said substrate (11) comprises a step of planarization (CMP) to planarize said layer of glass (78) on the free surface intended for coupling with said nozzle plate (12), said step of planarization having the task of ensuring a high degree of planarity on said free surface for allowing said layer of glass (78) to interface and couple at contact with said nozzle plate (12).

5. Method for manufacturing an ejection head according to claim 1, wherein, during the phase of joining said substrate (11) and said nozzle plate (12) by means of said anodic bonding technology, said substrate (11) is maintained at a pre-established temperature by means of a heating element (83).

6. Method for manufacturing an ejection head according to claim 1, wherein said actuator (15; 115*a*, 115*b*, 115*c*) is of the thermal type and in particular is made of a resistor (74) which is suitable for rapidly heating in order to generate, within said liquid (14; 140), a vapour bubble suitable to cause the ejection of said droplets, and wherein said conductive protection layer (77; 177) in made of tantalum (Ta).

7. Method for manufacturing an ink jet printhead (110) possessing internally a hydraulic circuit (121) for containing and conveying ink (140), comprising the following phases:

producing a nozzle plate (112) having at least one ejection nozzle (113*a,* 113*b,* producing a substrate (111) having at least one actuator (115*a,* 115*b,* 115*c*) for activating the ejection of said ink (140), in droplet form, through said at least one nozzle (113a, 113b, 113c); and integrally joining said nozzle plate (112) and said substrate (111) together to form said printhead (110) and the relative hydraulic circuit (121), said joining phase comprising the production of a junction (125), between said nozzle plate (112) and said substrate (111), arranged for being wetted by the ink (140) contained in the hydraulic circuit (121), wherein the phase of producing said nozzle plate (112) comprises the following steps:

providing a plate or wafer made of silicon;

selectively removing the silicon of said plate down a given depth, so as to form, along a face of said plate, a recess defining a chamber of said hydraulic circuit (121); and forming, by means of an etching process and along a bottom of said recess, said at least one ejection nozzle (113a, 113b, 113c);

wherein the phase of producing said substrate (111) comprises the following steps:

providing a plate or wafer made of silicon;

forming, on a face of said plate, said at least one actuator (115a, 115b, 115c) and the tracks for the electrical connection of it:

depositing a first protective layer of silicon nitride and of silicon carbide on said at least one actuator, depositing a second protective and conductive layer (177) of tantalum over said first protective layer of silicon nitride and of silicon carbide, said second conductive layer (177) of tantalum being arranged in the area of said at least one actuator and in the junction zone where said nozzle in plate (112) and said substrate (111) will joined together, depositing a continuous layer of borosilicate glass (178) over said second layer (177) of tantalum, selectively etching said continuous layer of borosilicate glass (178) in such a way that it extends only over said junction zone, and planarizing (CMP) the free surface of said layer of borosilicate glass (178), so as to ensure a high degree of planarity of said surface adapted for the successive junction phase of said substrate (111) with said nozzle plate (112), and wherein the phase of joining said substrate (111) and said nozzle plate (112) comprises the following steps:

positioning into reciprocal contact said nozzle plate (112) and said substrate (111), in correspondence of a said layer of borosilicate glass (78), in such a way to face exactly said at least one nozzle (113a, 113b, 113c) to said at least one actuator (115a, 115b, 115c), temporarily connecting together said nozzle plate (112) and said substrate (111), and joining, by means of the so-called "anodic bonding" technology, the assembly formed by the nozzle plate and the substrate, whereby a structural cohesion is obtained between the two surfaces of silicon and of borosilicate glass (98), in reciprocal contact, respectively of said nozzle plate (112) and of said substrate (111).

8. Method for manufacturing an ink jet printhead (110) according to claim 7, wherein the phrase of producing a nozzle plate (112) comprises the following steps:

providing a silicon wafer (151) comprising a plurality of elementary areas (112a, 112b, 112b) each corresponding to a nozzle plate;

forming by etching, on each of said areas, at least one chamber (120a; 112b; 112c) and one inlet duct (122) of the hydraulic circuit (121) of the corresponding nozzle plate (112), said inlet duct (122) being provided for feeding the ink (140) to said chamber (120a; 120b; 120c); and dividing said silicon wafer into elementary units each constituting a nozzle plate (112).

9. Method for manufacturing an ink jet printhead (110) according to claim 8, wherein said silicon wafer is of the thin type and has an indicative thickness of 75 μm.

10. Method for manufacturing an ink jet printhead (110) according to claim 8, further comprising the following steps:

providing a silicon wafer (170) comprising a plurality of elementary areas (111a, 111b, 111c) each corresponding to a substrate (111);

providing, on said silicon wafer (170), a protection layer of conductive material consisting of a plurality of reciprocally interconnected portions in such a way as to form an equipotential mesh or network (177), wherein each portion of said conductive layer is deposited on a respective elementary area (111a, 111b, 111c) of said silicon wafer (170), and extends both along the area of said actuator (115a, 115b, 115c) for the purpose of protecting it, and along the zone of the junction (125) which will subsequently be made between the substrate (111) and the nozzle plate (112), and in addition also externally to the junction zone (125);

providing a plurality of nozzle plates (112), made separately with respect to said substrate (111), aligning and arranging, on said silicon wafer (170), each of said nozzle plates (112) into contact with a corresponding elementary area of said silicon wafer (170);

connecting said equipotential network to a counter-electrode of an appropriate anodic bonding machine;

applying, by means of said counter-electrode, a suitable potential between said equipotential network and each nozzle plate (112) to produce said junction (125), based on the anodic bonding technology, between each elementary area (111a, 111b, 111c) of said silicon wafer (170), and corresponding nozzle plate (112), and dividing said silicon wafer (170) into a plurality of units, each formed by a single substrate and a single nozzle plate, and constituting an ink jet printhead.

11. Method for manufacturing an ink jet printhead (110) according to claim 10, comprising, after said step of providing a plurality of nozzle plates (112) on said silicon wafer (170), a step of connecting temporarily with on adhesive each of said nozzle plates (112) to the corresponding elementary areas (111a, 11b, 111c) of said silicon wafer (170).

* * * * *

UNITED STATES PATENT AND TRADEMARK OFFICE

CERTIFICATE OF CORRECTION

PATENT NO. : 6,780,340 B2
DATED : August 24, 2004
INVENTOR(S) : Renato Conta

It is certified that error appears in the above-identified patent and that said Letters Patent is hereby corrected as shown below:

Column 21,
Line 62, please replace "(98)" with -- (78) --

Column 22,
Line 59, please replace "on" with -- an --

Signed and Sealed this

Seventh Day of June, 2005

JON W. DUDAS
*Director of the United States Patent and Trademark Office*